(No Model.)

W. B. HOLLINGSHEAD.
SECONDARY BATTERY PLATE.

No. 434,869. Patented Aug. 19, 1890.

WITNESSES:
H. J. Morgan
W. P. Earll

INVENTOR:
Wm B Hollingshead.
By A. P. Thayer,
his Attorney

UNITED STATES PATENT OFFICE.

WILLIAM B. HOLLINGSHEAD, OF BRONXVILLE, ASSIGNOR OF ONE-HALF TO SYDNEY H. CARNEY, OF NEW YORK, N. Y.

SECONDARY-BATTERY PLATE.

SPECIFICATION forming part of Letters Patent No. 434,869, dated August 19, 1890.

Application filed March 6, 1890. Serial No. 342,886. (No model.)

*To all whom it may concern:*

Be it known that I, WILLIAM B. HOLLINGSHEAD, a citizen of the United States, and a resident of Bronxville, in the county of Westchester and State of New York, have invented new and useful Improvements in Secondary-Battery Plates, of which the following is a specification.

My invention is an improvement in the construction of secondary-battery plates of certain kinds of material that cannot of itself be readily formed in plates having the requisite cohesion, as red lead, black oxide of manganese, and other substances, as hereinafter more fully described, reference being made to the accompanying drawings, in which—

Figure 1:
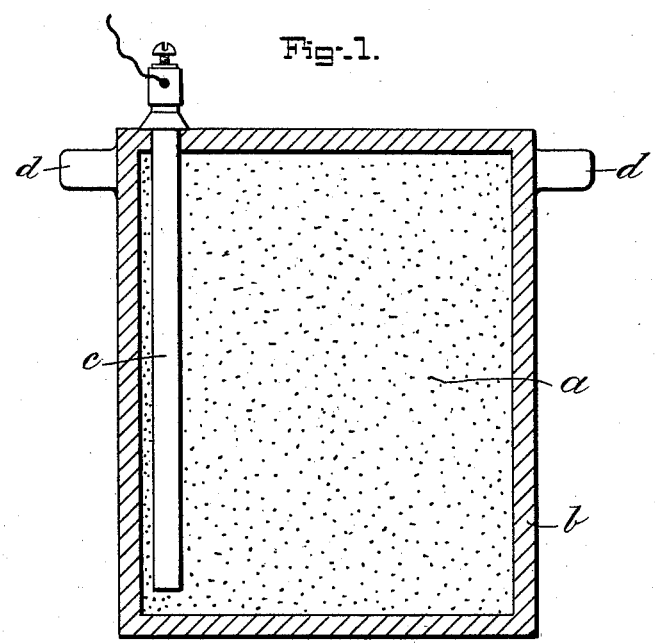
Figure 2:
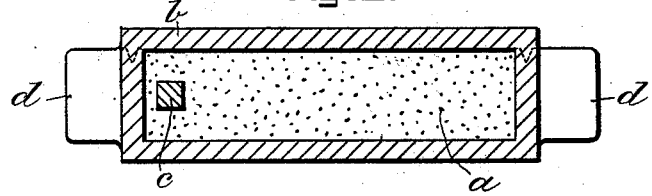
Figure 3:
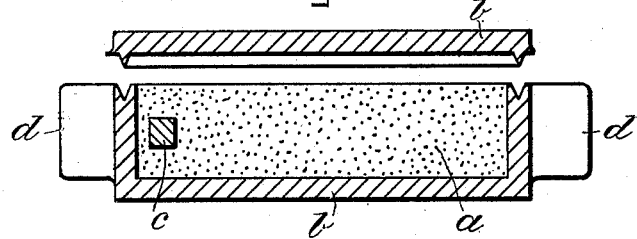

Figure 1 is a horizontal section of a plate constructed in accordance with my invention. Fig. 2 is a transverse section. Fig. 3 is a transverse section of a partly-formed plate illustrating the manner of making it.

My improved plate consists of the active material $a$, as red lead, black oxide of manganese, and the like substances, inclosed in a crust $b$ of porous material and having a carbon or other conductor $c$ connecting with it through the crust. In constructing it I make the crust of plastic kaolin or other approved material in two parts of suitable form to inclose the active material in sufficient quantity and proper shape and dimensions, and then inclose the material and join the edges of the parts in the manner of preparing pie-crusts of dough and inclosing the materials of the interior, and then in the same manner bake the crust and produce the porous condition, but applying the conductor so as to extend into the active material of the interior and project outward through the crust suitably for connecting the conducting-wire. The crust may have any approved form of lugs, as $d$, projecting from the sides, edges, or other part, for suspending it in the jar, or it may have feet to stand on the bottom of the jar. Where the edges of the two parts of the crust join, one may be grooved and the other ribbed to correspond to facilitate the joining of the edges, so that they will bake or burn together integrally. The edges to be joined may be pinched together, if desired. The plate may be subjected to pressure in a press and suitable mold while in a plastic state, if desired.

I claim—

1. In a plate for secondary batteries, the combination of active material, as red lead, black oxide of manganese, or other non-cohesive substance, and an integral inclosing-crust of porous material, substantially as described.

2. In a plate for secondary batteries, the combination of active material, as red lead, black oxide of manganese, or other non-cohesive substance, an integral inclosing-crust of porous material, and a conductor connected with the active material and extending out through the crust, substantially as described.

In testimony that I claim the foregoing as my invention I have signed my name, in presence of two witnesses, this 18th day of February, 1890.

WM. B. HOLLINGSHEAD.

Witnesses:
W. J. MORGAN,
W. B. EARLL.